United States Patent [19]

McGrath

[11] 4,310,566

[45] Jan. 12, 1982

[54] BATCH METHOD FOR TERMINATING SOLID ELECTROLYTE CAPACITORS

[75] Inventor: N. Christian McGrath, Strafford, N.H.

[73] Assignee: Sprague Electric Company, North Adams, Mass.

[21] Appl. No.: 152,445

[22] Filed: May 22, 1980

[51] Int. Cl.³ .............................................. H01G 9/00
[52] U.S. Cl. .................................... 427/80; 427/125; 427/264; 427/265; 427/270; 427/271; 427/273; 427/336; 427/284; 427/435; 427/436; 427/443.2
[58] Field of Search ................... 427/79, 80, 125, 264, 427/265, 270, 271, 273, 336, 284, 435, 436, 443.2

[56] References Cited

U.S. PATENT DOCUMENTS

| | | | |
|---|---|---|---|
| 3,055,777 | 9/1962 | Grad | 427/102 |
| 4,090,288 | 5/1978 | Thompson et a. | 427/80 |
| 4,203,194 | 5/1980 | McGrath | 427/25 |

Primary Examiner—Michael R. Lusignan
Assistant Examiner—Richard Bueker
Attorney, Agent, or Firm—Connolly and Hutz

[57] ABSTRACT

A plurality of porous valve-metal pellets, having the conventional oxide dielectric film, solid electrolyte, metallic counterelectrode, and insulative resin protective layer over the counterelectrode, are suspended by their anode risers from processing bars held in a carrier rack. Anode and cathode end-cap terminals are subsequently formed over opposite ends of each pellet, while the pellets are still suspended from the processing bars held in the carrier rack, by the selective steps of dipping and removing and curing of silver-loaded paint, and then nickel immersion plating over the cured silver caps, and then coating the nickel film with solder.

7 Claims, 5 Drawing Figures

U.S. Patent   Jan. 12, 1982   4,310,566
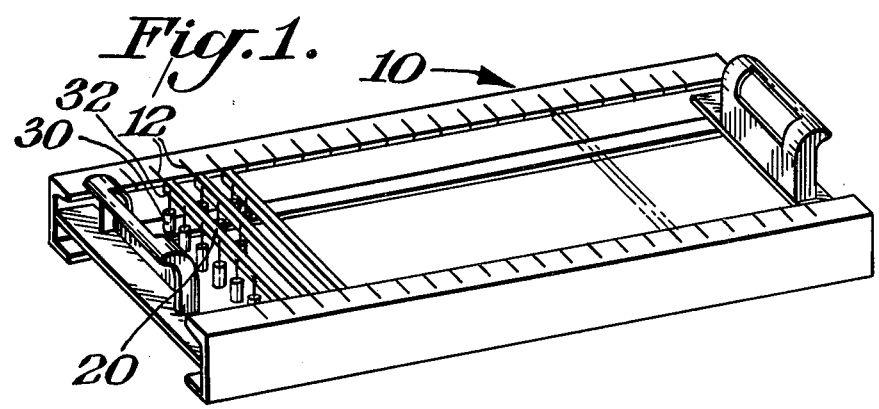
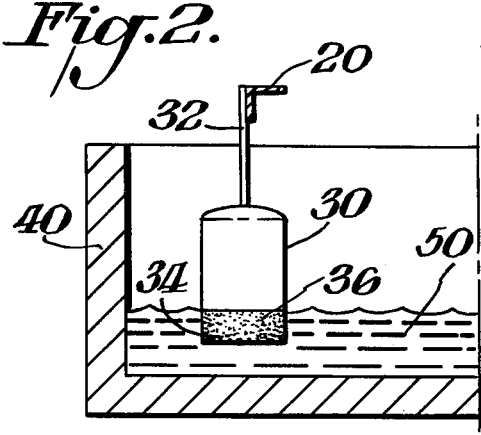 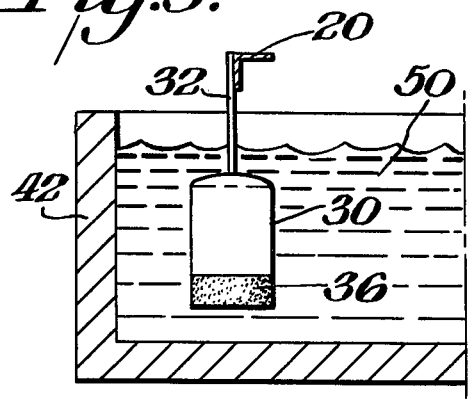
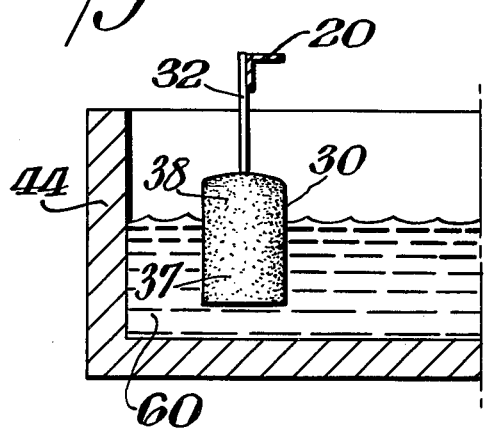 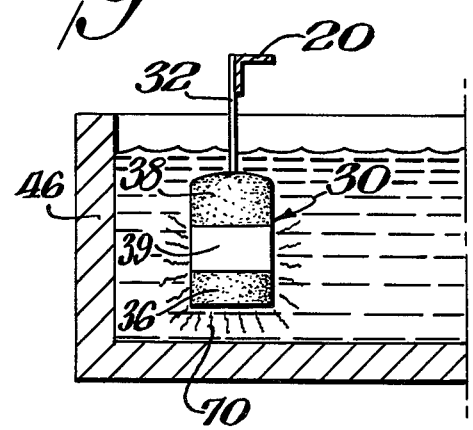

BATCH METHOD FOR TERMINATING SOLID ELECTROLYTE CAPACITORS

BACKGROUND OF THE INVENTION

This invention relates to a batch method for terminating solid electrolyte capacitors, and more particularly to such a method that produces a metal-loaded resin end-cap on both ends of a plurality of such capacitors.

Solid electrolyte chip capacitors having end-cap terminals are especially suitable for flush mounting to a printed wiring board, or the like, usually by reflow soldering thereto. An insulative protective layer is normally provided over a major portion of such a capacitor; which capacitor conventionally includes a porous valve-metal pellet having an oxide dielectric film formed over its surfaces, a solid electrolyte over the dielectric film, and a metallic counterelectrode over the solid electrolyte. A metal-loaded resin paint is applied over opposite ends of the pellet and partially over the insulative protective layer. One paint layer contacts the counterelectrode, and the other paint layer contacts a valve-metal riser wire extending from the pellet.

Batch fabrication of solid electrolyte capacitors is accomplished by suspending a plurality of pellets by their risers from a processing bar, and by positioning a plurality of such processing bars in a common carrier rack. The objective of batch fabrication of solid electrolyte capacitors is to accomplish as much as possible of the manufacturing cycle while the many pellets are in the common carrier rack. In other words the objective is to work on a full rack of capacitors (e.g. 3000) at each process step, rather than a single processing bar or even a single capacitor as taught in the prior art for one or more of the steps involved in terminating capacitors.

My prior U.S. Pat. No. 4,203,194 issued May 20, 1980 teaches the fabrication of solid electrolyte capacitors through to the production of end-caps on both ends of pellets while the pellets are welded to processing bars that are mounted in a common carrier rack. The end-caps are produced according to the parent application by spraying silver onto the top and bottom end faces of the pellets, and thereafter nickel plating the silver and then coating the nickel with solder.

The sprayed silver end-caps of my prior patent U.S. Pat. No. 4,203,194 are effective, but costly to produce because of the need for masking each pellet to ensure separation between the two end-caps. Part of the cost is the need to remove each processing bar from the carrier rack for the masking and spraying steps. This prior process also requires a large inventory of masks so as to accommodate the many sizes of capacitors that require end-caps. My prior end spray process is wasteful of silver, because much of the sprayed silver is deposited on the masks and surrounding equipment from which reclaiming is less than complete.

SUMMARY OF THE INVENTION

A feature of this invention is the provision of a low cost batch method of applying complete end-caps to a large number of capacitor bodies that are suspended from processing bars while the bars are retained in the same carrier rack that has taken the capacitor bodies through all prior processing steps.

In accordance with this invention a carrier rack of insulated capacitor bodies is provided with end-caps on the opposite ends of each capacitor body by applying a cured silver end-cap on the cathode end of each body, applying a partially cured silver coating over all of each body, removing the partially cured coating from between the cathode and anode ends of each body, and completing the cure of the partially cured coating on the anode end of each body.

BRIEF DESCRIPTION OF THE DRAWINGS

In a drawing which illustrates embodiments of the invention:

FIG. 1 is a perspective of a carrier rack holding a plurality of capacitor bodies suspended from processing bars;

FIG. 2 is a diagramatic showing of a single capacitor body in the rack of FIG. 1 being dipped to coat its cathode ends;

FIG. 3 is a diagramatic showing of the body of FIG. 2 being dipped to coat its anode end;

FIG. 4 is a diagramatic showing of the body of FIG. 3 being dipped in a solvent for the coating material; and FIG. 5 is a diagramatic showing of the body of FIG. 4 being dipped to remove the solvent.

DESCRIPTION OF THE INVENTION

In general, the batch method of this invention includes the steps of dipping a carrier rack of insulated capacitor bodies into a silver composition to a depth to cover the exposed cathode ends of the many bodies, and then the deposited silver is cured. The rack of capacitor bodies is then dipped into the silver composition to a depth to cover the full bodies and contact the risers, and then deposited silver is only partially cured. The rack is then dipped to a depth short of the anode end of the bodies into a solvent for the binder of the silver composition, and then the solvent and the solvent contacted silver are removed from the bodies. The rack of bodies with cured silver at the cathode end and partially cured silver at the anode end of each body is then heated to complete the cure of the anode silver.

FIG. 1 shows a carrier rack 10 in which a plurality of processing bars 20 are carried, by being positioned in slots 12 in rack 10. Each carrier bar 20 has a plurality of capacitor bodies 30 suspended therefrom by means of riser members 32. It is typical for a rack 10 to carry as many as 120 processing bars 20, which each have welded thereto 25 capacitor bodies 30; thereby permitting the processing of 3000 capacitors as a batch, with all the incident savings attendant thereto.

The rack 10 of FIG. 1 carries the bodies 30 through the several processing steps described in my my prior patent U.S. Pat. No. 4,203,194 for fabricating solid electrolyte capacitors through to the application of an insulating protective coating over the major portions of each body; but stopping short of the fabrication of the end-cap terminations. At the risk of oversimplification, my present invention is an improvement over the end-cap procedures of my prior patent.

FIG. 2 shows a single capacitor body 30 from the plurality of bodies 30 carried by rack 10 in FIG. 1. Although the method steps of this invention are more easily depicted by a single body 30, it should be understood to be a feature of this invention that in each of FIGS. 2 through 5 an entire rack 10 is treated simultaneously as a single batch.

FIG. 2 shows body 30 suspended by its riser 32 from carrier bar 20. Body 30 is dipped into a tank 40 of silver composition 50 to a depth sufficient to cover the exposed cathode coatings on end 34 of body 30, and to extend up the side of body 30 to form an end-cap 36. Silver composition 50 can be any of the commercial materials that are used in the capacitor art to produce conductive layers. The preferred composition of this invention is a single component epoxy-based preparation having an anhydride curing agent and a butyl Cellosolve thinner, sold by DuPont as silver 5815.

Body 30 and its silver end-cap 36 are removed from tank 40, air dried, and cured by heating for about 2 hours at 175° C. Other time and temperature combinations may be employed; it being important only that full curing of the silver composition be attained. As short a time as 1 hour at as low as 150° C. will fully cure the silver composition.

FIG. 3 shows body 30 with cured end-cap 36 dipped into a tank 42 to a depth to completely cover the body 30 and a portion of riser 32. Tank 42 contains silver composition 50; it being a feature of this invention that the same silver composition is employed for both the cathode and the anode end-caps.

The body 30 with its full silver coating 37 is withdrawn from tank 42, air dried, and partially cured for about 15 minutes at 150° C. The coating 37 is not completely cross-linked; about 50 percent has been found preferable for the later steps of selective removal of portions of coating 37.

The partial cure of this step is essential for the subsequent steps of removal of selected portions of coating 37. If coating 37 is overcured, the epoxy will not be removed by the selected solvent in the removal step, and the anode will be shorted to the cathode by the residual silver coating. If coating 37 is undercured, the solvent in the removal step will be absorbed by wicking action into the upper portion of silver coating 37 where the solvent will attack most of the silver that is needed for the anode end-cap. It was found experimentally that 5 minutes at 150° C. resulted in the undercure condition, 10 minutes was found to be barely safe partial cure, and 30 minutes was an overcure; hence 15 minutes was selected as optimum.

FIG. 4 shows body 30 with partially cured silver coating 37 dipped into tank 44 of solvent 60 to a depth so as to leave exposed a silver end-cap 38 of substantially the same width as cathode end-cap 36. Solvent 60 is preferably N-methyl-2-pyrrolidone, called M-Pyrol by GAF, which is a known epoxy paint stripping agent. It has been found that about a 1 minute dip is sufficient to introduce enough of solvent 60 to attack silver 37, provided that solvent 60 remains in coating 37 for about an additional 4 minutes. Alternatively, the body 30 may be left in solvent 60 for the full 5 minutes without deleterious effect on the portions of coating 37 that are not dipped into the solvent.

Solvent 60 serves to leach out the partially cured epoxy binder and leave the silver flake component of silver composition 50. It has been found that M-Pyrol has no effect on fully cured epoxy compounds when the compounds are subjected to the solvent action for the short times of this invention. Thus, the fully cured silver end-cap 36 is not attacked during the short solvent contact of this step. Also, the fully cured epoxy protective coating produced in accordance with my prior patent U.S. Pat. No. 4,203,194 is not attacked in the FIG. 4 step of this invention.

FIG. 5 shows body 30 dipped into tank 46 containing an ultrasonic medium 70, and being subjected to ultrasonic action to remove the portion of coating 37 that had been attacked by solvent 60. Water has been found to be a suitable medium 70 for the ultrasonic bath, because the solvent 60 is fully miscible with water. The portions of silver coating 37 from which the epoxy component has been removed are torn from body 30 by the ultrasonic action. Because end-cap 36 was fully cured, only overlying coating 37 is removed from the cathode in this ultrasonic step. Because partially cured end-cap 38 was not subjected to the action of solvent 60, the epoxy component holds end-cap 38 in place against the ultrasonic action. The silver flake which is displaced by the ultrasonic action from coating 37 including the band 39 between end-caps 36 and 38 is readily recovered from the water medium 70 by simple filtration.

After withdrawal of body 30 from ultrasonic tank 46, the body has been provided with a fully cured silver end-cap 36, a partially cured silver end-cap 38, and a portion 39 that is free of all silver. End-cap 38 is thereafter fully cured by heating for about 2 hours at 175° C., as set forth above for end-cap 36.

The silver end-caps 36 and 38 are preferably provided with a nickel coating, as by electroless plating in a commercial plating solution, e.g. Niposit 65 from Shipley Co. containing about 80 percent nickel. The nickel coatings on end-caps 36 and 38 are thereafter coated with a layer of solder by passing the rack 10 through a commercial wave solder bath. The nickel plating and solder coating steps also may be accomplished as taught in my prior patent U.S. Pat. No. 4,203,194.

In accordance with the teachings of the present application, the nickel plating and solder coating steps are conducted with the plurality of bodies 30 still suspended from processing bars 20 and still carried in rack 10. In the nickel plating step, as in the other dipping steps of this invention, only the capacitor bodies are in contact with the solutions, thereby enhancing the life of the racks and processing bars.

What is claimed is:

1. A batch method for terminating a plurality of solid electrolyte capacitors held in a carrier rack, said capacitors including an insulating protective coating on each capacitor body which leaves exposed the cathode and anode at opposite ends of each said body, wherein the improvement comprises applying a cured silver end-cap on the cathode end of each said body, depositing a partially cured silver coating over all of each said body including the anode end, removing said partially cured coating from between said cured cathode end-cap and the anode end of each said body, and completing the cure of said partially cured coating on the anode end of each said body.

2. The batch method of claim 1 wherein said applying step comprises dipping said plurality of bodies held in said carrier rack into a silver composition to a depth to cover the exposed cathode end of each said body, and thereafter curing said cover.

3. The batch method of claim 2 wherein said depositing step comprises dipping said plurality of bodies held in said carrier rack into said silver composition to a depth to coat both the cathode and anode ends of each said body, and thereafter partially curing said coat.

4. The batch method of claim 3 wherein said removing step comprises dipping said plurality of bodies held in said carrier rack into a solvent for the binder of said silver composition to a depth short of the anode end of each said body, and thereafter eliminating said solvent from each said body.

5. The batch method of claim 4 wherein said eliminating step comprises immersing said plurality of bodies on said carrier rack into a liquid miscible with said solvent and agitating said liquid.

6. The batch method of claim 5 wherein additional conductive layers are applied over said cured silver on the cathode and anode ends of each said body.

7. The batch method of claim 6 wherein said layers are applied by first nickel plating and thereafter solder coating said nickel.

* * * * *